United States Patent
Baio et al.

(10) Patent No.: US 8,290,980 B2
(45) Date of Patent: Oct. 16, 2012

(54) GENERATING EVENT DATA DISPLAY CODE

(75) Inventors: Andrew Baio, Palo Alto, CA (US);
Gordon Luk, Sunnyvale, CA (US);
Leonard H. Lin, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 550 days.

(21) Appl. No.: 11/517,971

(22) Filed: Sep. 8, 2006

(65) Prior Publication Data

US 2008/0065599 A1 Mar. 13, 2008

(51) Int. Cl.
*G06F 7/00* (2006.01)
*G06F 17/30* (2006.01)

(52) U.S. Cl. .................................................. 707/783

(58) Field of Classification Search ................ 707/783, 707/999.01
See application file for complete search history.

(56) References Cited

U.S. PATENT DOCUMENTS

| | | | |
|---|---|---|---|
| 6,018,343 A | 1/2000 | Wang et al. | |
| 6,088,717 A | 7/2000 | Reed et al. | |
| 6,216,110 B1 | 4/2001 | Silverberg | |
| 6,369,840 B1 | 4/2002 | Barnett et al. | |
| 6,546,188 B1 * | 4/2003 | Ishii et al. | 386/52 |
| 6,684,385 B1 * | 1/2004 | Bailey et al. | 717/109 |
| 6,768,994 B1 | 7/2004 | Howard et al. | |
| 6,802,054 B2 * | 10/2004 | Faraj | 717/128 |
| 6,823,357 B1 | 11/2004 | Du et al. | |
| 6,934,740 B1 * | 8/2005 | Lawande et al. | 709/213 |
| 6,966,065 B1 * | 11/2005 | Kitazato et al. | 725/116 |
| 7,174,517 B2 | 2/2007 | Barnett et al. | |
| 2002/0065851 A1 | 5/2002 | Watson et al. | |
| 2003/0033296 A1 | 2/2003 | Rothmuller et al. | |
| 2003/0069904 A1 * | 4/2003 | Hsu et al. | 707/204 |
| 2003/0200192 A1 | 10/2003 | Bell et al. | |
| 2003/0225732 A1 | 12/2003 | Chan et al. | |
| 2004/0015476 A1 | 1/2004 | Twaddle | |
| 2004/0128169 A1 | 7/2004 | Lusen | |
| 2004/0133544 A1 | 7/2004 | Kiessig et al. | |
| 2004/0225672 A1 | 11/2004 | Landers et al. | |
| 2005/0120009 A1 | 6/2005 | Aker | |
| 2005/0197894 A1 * | 9/2005 | Fairbanks et al. | 705/14 |
| 2005/0262164 A1 | 11/2005 | Guiheneuf et al. | |

(Continued)

OTHER PUBLICATIONS

Yahoo, "Upcoming.org: News: Dynamic Badges," Yahoo Upcoming. org news archives 2005, retrieved from the internet at http://upcoming.org/news/archives/2005/09/08/dynamic_/, retrieved on Aug. 23, 2006, 7 pages.

(Continued)

*Primary Examiner* — Aleksandr Kerzhner
(74) *Attorney, Agent, or Firm* — Hickman Palermo Truong Becker Bingham Wong LLP; Edward A. Becker

(57) ABSTRACT

Techniques for republishing event data are provided. An event data repository contains event records defining real world events. Users request instructions for republishing event data. The request includes data identifying a set of event data and display characteristics for republication. In response to the request, event data display code is provided back to the client. The user may use the event data display code to display event data on the user's own web pages or applications. When the event data display code is processed by a web browser application, a request is sent to the events repository, which provides the identified set of event data in response. The event data is displayed to users at the web browser using the display characteristics specified by the client.

39 Claims, 9 Drawing Sheets

U.S. PATENT DOCUMENTS

| | | |
|---|---|---|
| 2005/0289642 A1 | 12/2005 | Pacholec et al. |
| 2006/0224615 A1 | 10/2006 | Korn et al. |
| 2006/0253456 A1 | 11/2006 | Pacholec et al. |
| 2007/0011147 A1 | 1/2007 | Falkenberg |
| 2007/0043688 A1 | 2/2007 | Kountz et al. |
| 2007/0053513 A1* | 3/2007 | Hoffberg ............ 380/201 |
| 2007/0162322 A1 | 7/2007 | Shahine et al. |
| 2007/0185835 A1 | 8/2007 | Ursitti et al. |
| 2007/0198939 A1 | 8/2007 | Gold |
| 2007/0239761 A1 | 10/2007 | Baio et al. |
| 2008/0065599 A1 | 3/2008 | Baio et al. |
| 2008/0065740 A1 | 3/2008 | Baio et al. |
| 2008/0104032 A1 | 5/2008 | Sarkar |
| 2008/0162498 A1 | 7/2008 | Omoigui |

OTHER PUBLICATIONS

Flickr, "Flickr : Learn More?," Yahoo Inc. 2007, retrieved from the internet at http://www.flickr.com/learn_more.gne, retrieved on Jan. 9, 2007, 6 pages.

* cited by examiner

Post an Upcoming.org Badge to your website! It's fast, free, and easy!
Upcoming.org Dynamic Badges let you post your public event watchlist, or a group's event list to your online blog or journal! When you fill out this form, we will give you a little snippet that you can paste in your blog, which will automatically update with your upcoming events!

1. Choose which type of badge you want.   2. Set up the display options.   3. Copy and paste the code into your website.

What kind of badge do you want?

◉ The public events on your watchlist.
   Only public events you are watching or attending will be included in your badge.

○ The public events in a public group you have joined.
   [ Flickr ☑ ]

Choose a badge template, or none, if you want to style it yourself.

◉ The medium-sized Clean style.    ○ The Upcoming-themed Classic style.    ○ Just give me HTML, I'll style it myself. (For CSS wizards)

Upcoming.org Events

No upcoming events.

More of wario9999's events

---

Upcoming.org Events

No upcoming events.

More of wario9999's events

---

[ Next: Set up display options ]

| 1. Choose which type of badge you want. | 2. Set up the display options. | 3. Copy and paste the code into your website. |

Choose the display settings you would prefer:

How many events would you like to display on your badge?

◉ Small (5 Events).

○ Medium (10 Events).

Would you like the name of each event's venue to show up on your badge?

◉ Yes, please show each event's venue.

○ No thanks, don't show each event's venue.

What data format do you prefer? (Example: October 31, 2004)

○ None / Hidden

○ Oct 31

◉ October 31

○ October 31, 2004

○ Tuesday, Oct 31

○ 10/31/2004

○ 31/10/2004

Choose your formatting options. Let us know what else you'd like to customize.

☐ No background

[ Next: Get Your Badge On! ]

| 1. Choose which type of badge you want. | 2. Set up the display options. | 3. Copy and paste the code into your website. |

You're all done! Have a look through your badge below, and see if you need to make any changes. If everything looks good, then copy and paste the code in the box on the right to your own website, and your badge should appear!

Example

Upcoming.org Events

No upcoming events.

More of wario9999's events

Code for your website

```
<!-- Start of Upcoming.org Badge -->
<style type="text/css">
div#upcoming_clean_medium
{width:150px;margin:0;padding:8px;background-color
solid #ADAABD;border-bottom:1px solid #ADAABD;}
div#upcoming_clean_medium
.upb_text,div#upcoming_clean_medium a
{color:#333;font:normal 11px Verdana, Arial,
Helvetica, sans-serif}
div#upcoming_clean_medium a
{color:#0000A5;text-decoration:none;}
div#upcoming_clean_medium a:hover
{background-color:#eee;}
div#upcoming_clean_medium .upb_header {padding:3px
3px 5px 0px;}
div#upcoming_clean_medium .upb_header .upb_text
{font: normal bold 12px Georgia,
Serif;color:#424142;}
div#upcoming_clean_medium .upb_header a{font:
normal bold 12px Georgia, Serif;color:#A51410;}
```

[ « Edit your badge settings ]

FIG. 3D

```
<!-- Start of Upcoming.org Badge -->
<style type="text/css">
div#upcoming_clean_medium {width:150px;margin:0;padding:8px;background-color:#F7F7F7;border-right:1px solid #ADAABD;border-bottom:1px solid #ADAABD;}
div#upcoming_clean_medium .upb_text,div#upcoming_clean_medium a {color:#333;font:normal 11px Verdana, Arial, Helvetica, sans-serif}
div#upcoming_clean_medium a {color:#0000A5;text-decoration:none;}
div#upcoming_clean_medium a:hover {background-color:#eee;}
div#upcoming_clean_medium .upb_header {padding:3px 3px 5px 0px;}
div#upcoming_clean_medium .upb_header .upb_text {font: normal bold 12px Georgia, Serif;color:#424142;}
div#upcoming_clean_medium .upb_header a{font: normal bold 12px Georgia, Serif;color:#A51410;}
div#upcoming_clean_medium .upb_events {margin:0;padding:5px 0px;}
div#upcoming_clean_medium .upb_event {margin-bottom:5px; line-height: 140%;}
div#upcoming_clean_medium li {list-style: none;}
div#upcoming_clean_medium .upb_date {border-bottom:1px solid #C6C3C6;margin:10px 0 3px 0}
div#upcoming_clean_medium .upb_date .upb_text{color:#424142;font-size: 11px;font-weight: bold;border-bottom:1px solid #C6C3C6;color: #424142;margin:10px 0 3px 0}
div#upcoming_clean_medium .upb_more {margin: 20px 0px 5px 0px;text-align:left}

</style>
<div class="upcoming_badge" id="upcoming_clean_medium">
  <div class="upb_header"><span class="upb_text"><a href="http://upcoming.org">Upcoming.org</a> Events</span></div>
  <div class="upb_events"><script type="text/javascript" src="http://badge.upcoming.org/v1/?badge_type=user&badge_size=sm&badge_layout=v&badge_styling=2&badge_no_background=&badge_venue=1&date_format_type=us_med&id=44975"></script></div>
  <div class="upb_more"><span class="upb_text"><a href="http://upcoming.org/user/44975/">More of <u>wario9999's events</u></a></span></div>
</div>
<!-- End of Upcoming.org Badge - get your own at http://upcoming.org/badge/ -->
```

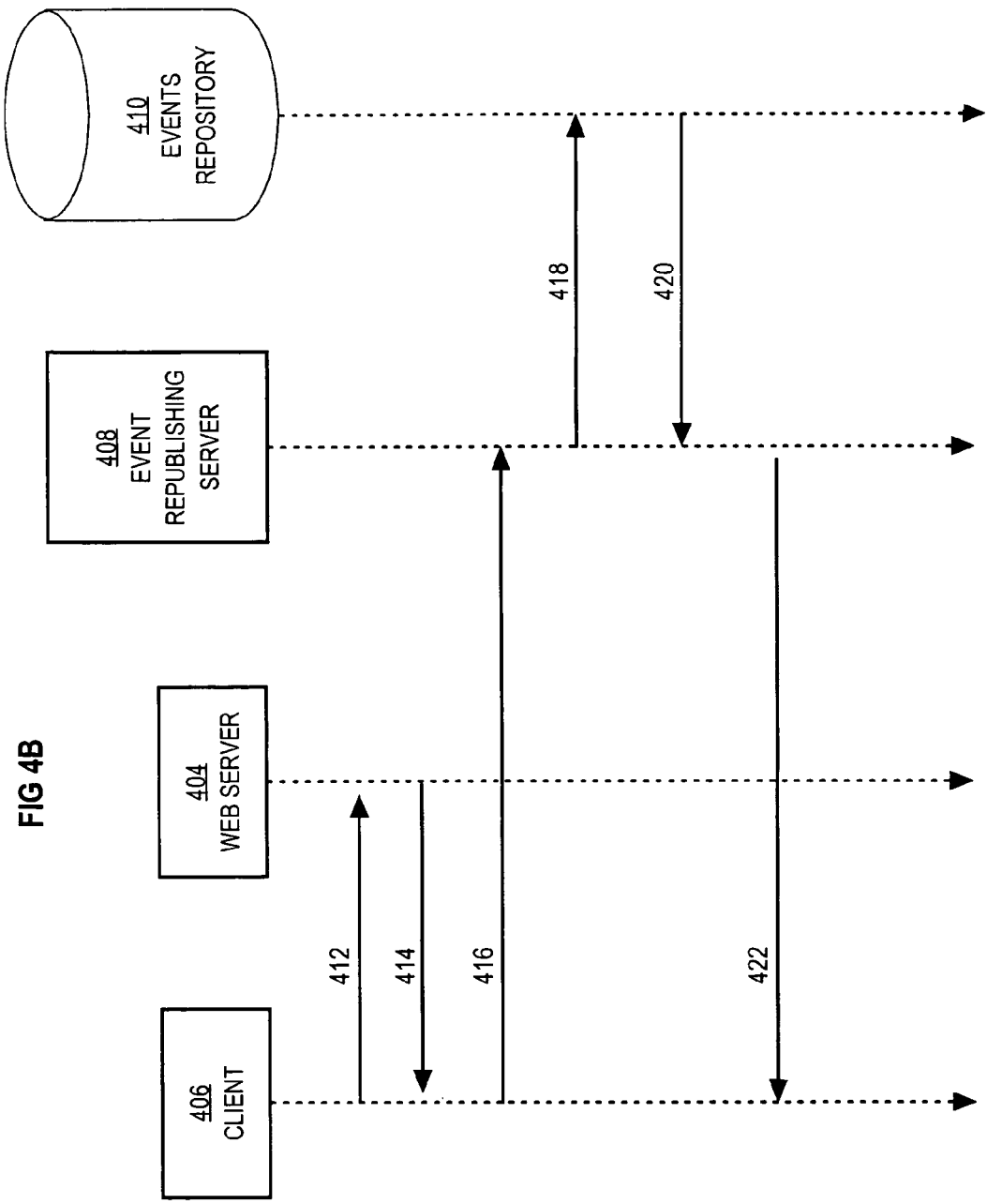

GENERATING EVENT DATA DISPLAY CODE

This application is related to U.S. patent application Ser. No. 11/392,092 filed on Mar. 28, 2006, entitled "ACCESSING AN EVENTS REPOSITORY"; and U.S. patent application Ser. No. 11/517,972 filed Sep. 8, 2006, entitled "REPUBLISHING GROUP EVENT DATA"; the entire content of which is incorporated by this reference for all purposes as if fully disclosed herein.

FIELD OF THE INVENTION

The present invention relates to republishing event data and, more specifically, to a technique for generating event data display code.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Event marketers and promoters typically desire to have event information reach a large number of people to increase the popularity and attendance of the event. Thus, traditional media such as print, radio and television are conventionally used to communicate event information to a large amount of the population. The larger the audience the event information reaches, the more likely the attendance of the event will increase.

Through the advent of the Internet and the World Wide Web ("Web"), communication of such events may be instant and widespread to an even larger portion of the population. Further, publishing event information over the Internet incurs minimal cost in relation to traditional media. For example, the event information need not be replicated on physical paper, and the cost of digital replication is minimal when compared to using traditional media. In order to communicate such event information to Internet users, marketers and promoters create web content which may be accessed through an event application associated with a web address. Internet users may view the event information by using a web browser to send a request to the web address. In response to the request, the event application sends to the browser a web page that includes event information.

Unfortunately, users who do not have knowledge of an event repositories Application Programming Interface (API) find it difficult to re-publish event information on their own web pages or within their own applications. For example, a particular user may desire to publish the events he/she is interested in attending on his/her personal website. Although users may utilize an API to retrieve such information from an events repository, such a method is labor intensive and requires the user to have extensive programming and knowledge of back-end server technologies. Further, users who do not have knowledge of web page design techniques and find it difficult to design interfaces for re-publishing event information. For example, even though a user may know how to access the event information, many users do not have the time to spend to design elaborate graphical interface displays. Although presentations of event information do exist, existing presentations of event information are usually pre-designed and users lack the control to determine how event information is to be displayed to third parties.

Therefore, what is desired is an improved mechanism for re-publishing event information.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a diagram depicting a graphical user interface for selecting a set of event data for republication according to one embodiment of the invention;

FIG. 3B is a diagram depicting a graphical user interface screen for selecting display characteristics for republishing event data according to one embodiment of the invention;

FIG. 3C is a diagram depicting a graphical user interface screen for providing event data display code according to one embodiment of the invention;

FIG. 3D is a diagram depicting event data display code according to one embodiment of the invention;

FIG. 4B is a diagram depicting a communication flow for republishing event data according to one embodiment of the invention.

DETAILED DESCRIPTION

Figure 1:
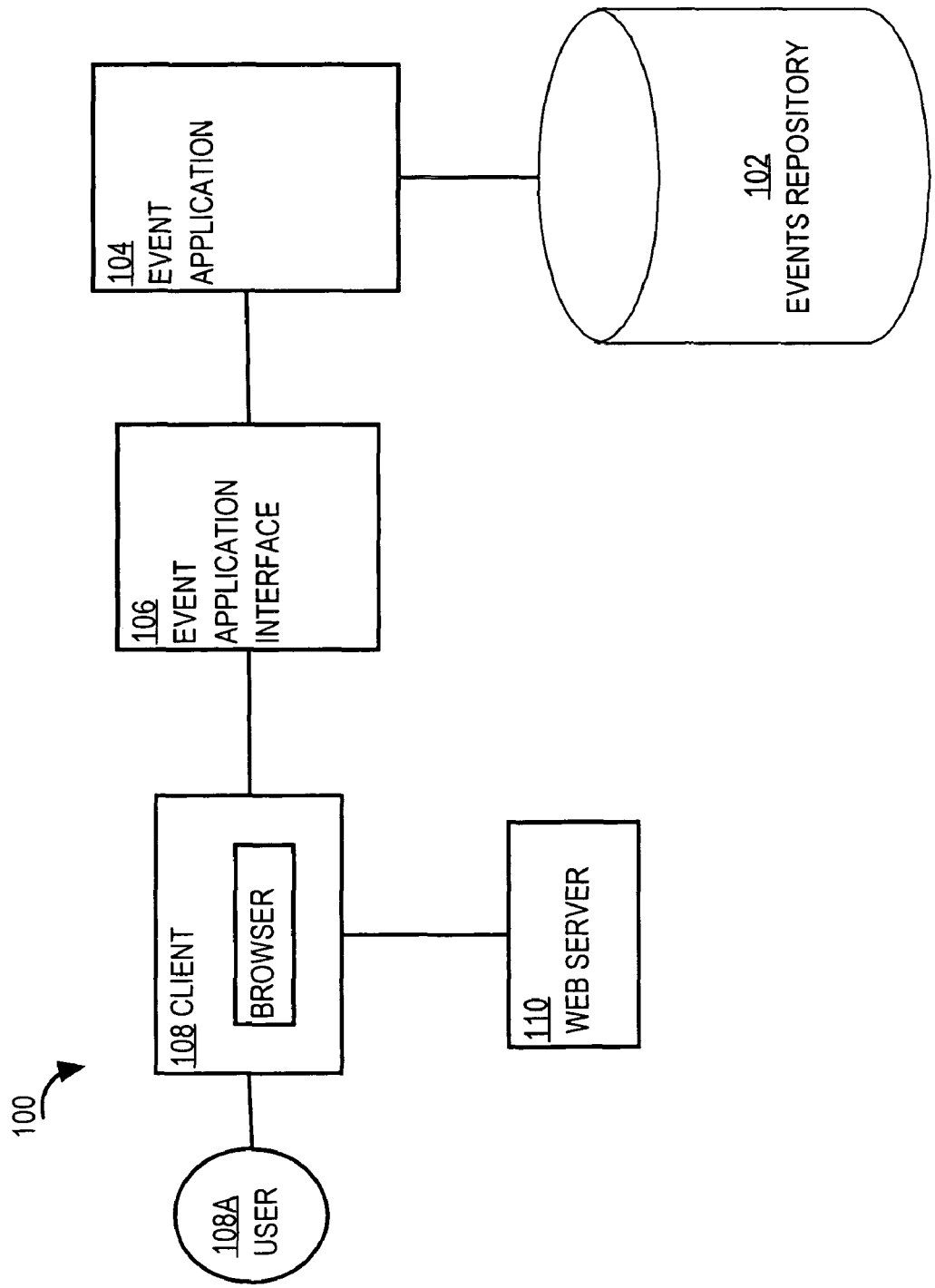
FIG. 1 is a block diagram depicting a communications system for generating event data display code according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An event-sharing system includes an event application that provides access to an events repository. Event data within the events repository reflects real world events. The event application may be used by clients to share real world event data. Specifically, the event application includes an event application interface that allows clients to share and collaborate in a social events network environment. The event application also allows clients to request event data display code for republishing event data to end-user applications that do not interact directly with the event application or events repository. Clients can insert the event data display code into web pages or applications that are available for end user applications to retrieve.

When end-user applications retrieve web pages or applications that contain the event data display code, the end-user applications process the code and cause a request to retrieve event data to be sent to an event republishing server. The event republishing server responds to the request by performing a query on the events repository and responding with the appropriate event records, which contain event data reflecting real world events. Further, through the event application interface, clients may customize the manner in which event data is displayed to end-users using end-user applications.

Therefore, according to one aspect of the invention, a method is provided for generating event data display code, the method comprising receiving, from a client over a network, first data that identifies a set of event data stored in a repository, wherein the event data stored in the repository reflects real world events, receiving from the client second data that identifies one or more display characteristics for the event data, wherein the display characteristics indicate the manner in which the event data is to be displayed, receiving from the client a request for a set of one or more instructions, which, when processed, causes the set of event data to be displayed on a graphical user interface in the manner specified by the second data, and, in response to the request, generating and providing the set of instructions to the client.

According to one embodiment, the events repository may store event data in an organized data structure. One such data structure is a database, and the event data reflecting real world events is stored in the form of event records. In one embodiment, event records within the events repository may be identified by an event ID, and event-author, an event venue and a time. The event-author information identifies the user that created the event record information. Also, the event venue identifies the physical location of the event while the event time identifies the calendar/clock time when the event will occur. Other information that may be associated with an event record includes a title and description of the event. Additionally, event records may indicate whether a client has republishing rights to an event, and whether the client has selected the event record to be of interest to the client or included in a client's "watch list." Note that while event data is described as being stored in the form of event records in an events repository, the invention is not limited to such an embodiment, and event data may be stored in any data structure and organized in any appropriate matter.

System for Generating Event Data Display Code

In order to access information within the events repository, operations are performed against the events repository by an event application. The event application is controlled by end-users through a graphical user interface known as the event application interface, which may be accessed locally or via the Internet.

Referring now to FIG. 1, a block diagram illustrating a Communications system 100 for generating event data display code is shown in accordance with one embodiment. Communications system 100 includes an Events Repository 102, an Event Application 104, an Event Application Interface 106, a Client 108, and a Web Server 110. The components of Communications system 100 exchange data through one or more communication connections. A communication connection may be implemented by any medium or mechanism that provides for the exchange of data between the components of Communications system 100. Examples of a communications connection include, without limitation, a network such as a Local Area Network (LAN), Wide Area Network (WAN), Ethernet or the Internet, or one or more terrestrial, satellite or wireless links. A communication connection may be a secure or unsecured communications link, depending upon a particular implementation.

Events Repository 102 is used to store event data reflecting one or more real world events. According to one embodiment, the event data is stored in a structured data object such as a database. In this particular embodiment, the event data is stored as event records within the Events Repository 102, and event records reflect real world events. Real world events may be events that take place at a geographic location at a calendar based time. For instance, examples of real world events include, without limitation, concert shows, birthday parties, dinner parties, meetings, and other similar events.

Event Application 104 generally represents an application that is designed to perform operations on the Events Repository 102. Example operations that the Event Application 104 may perform on Event Repository 102 include querying data according to user-specified filters and inserting data into the Events Repository 102 in the form of event records. Additionally, Event Application 104 formats data received from the Events Repository 102 for display to a user using the Event Application Interface 106. Through the Event Application Interface 106, a user may interact with the Event Application 104 to perform a number of other tasks as outlines in further detail herein.

Event Application Interface 106 provides an interface for allowing users to access, view and modify information located within the Events Repository 102. The Event Application Interface 106 allows users to control the Event Application 104 through a graphical user interface (GUI) environment. According to one embodiment, the Event Application Interface 106 is implemented as a web application that may be accessed via the Internet or World Wide Web (Web). In other embodiments, the Event Application Interface 106 may be located locally with the same system as Event Application 104 or Events Repository 102.

In another embodiment, the Event Application Interface 106 allows users to request event data display code. Event data display code is used by users to display event data on user's own web pages or applications that are separate from the Event Application 104 and Event Application Interface 106. For instance, using the Event Application Interface 106, a user of Client 108 can interact with Event Application 104 and select a particular set of events that the user would like to republish using an application separate from the Event Application 104. Specifically, a user of Client 108 may desire to re-publish event data to users via Web Server 110. In order to do so, a user of Client 108 may request event data display code so that the display code may be inserted into client applications. Examples of such applications include, without limitation, web pages hosted by a Web Server 110 or other client based applications. Instead of requiring end-users to directly interact with Event Application 104 to obtain the event data, users may simply interact with Web Server 110 and view a tailored set of event data as selected by Client 108.

Interface for Requesting Event Data Display Code

In one embodiment, when a user would like to republish event data on the user's web page or application, the user may invoke a web browser and request to access the event application interface. The event application interface is provided to the web browser, and, when executed, cause a graphical user interface to be presented to the user using the browser. Through the event application interface, a user requests a set of instructions which may be used to republish the event data. The set of instructions are referred to herein as the event data display code. Using the event application interface, a client can select a set of events, display characteristics, and other parameters causing event data display code to be generated and used to display event data on the user's web page or application.

Generally, according to one embodiment, clients are allowed to republish events from the Events Repository 102 to which a user of Client 108 has republication rights for. In order to determine which event records a user has republication rights for, the event application interface 106 can request user identification information. When Client 108 invokes the event application interface, for example, through a web browser, the event application interface can request that the user enter identifying information such as a user name and password. Once the event application interface verifies the user's identity, the event application can communicate with the event data repository to determine which event records the user is authorized to republish to third parties.

Figure 2:
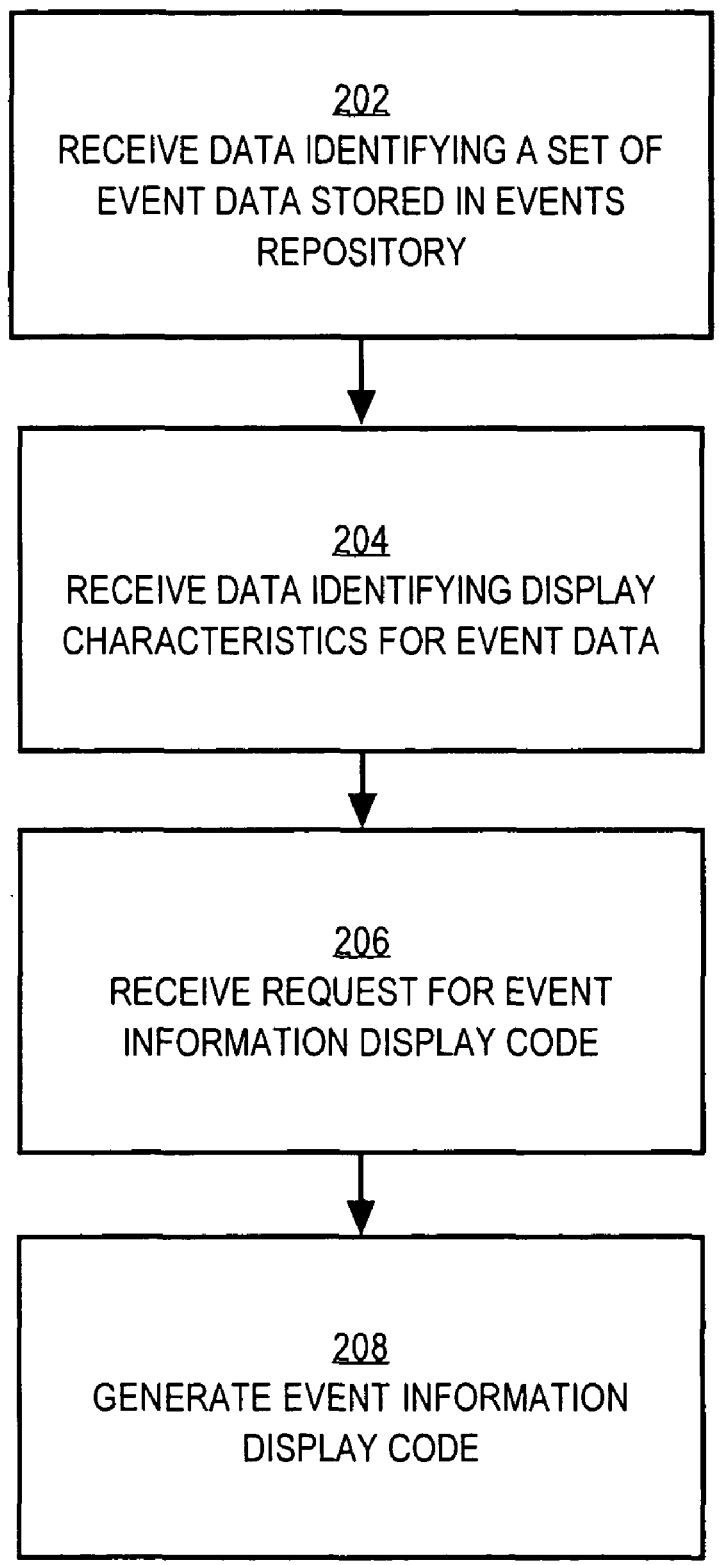
FIG. 2 is a flow diagram depicting a process for generating event data display code according to one embodiment of the invention.

Thus, after verifying the identity of the user of Client 108, Event Application 104 can allow Client 108 to request event data display code using Event Application Interface 106. FIG. 2 is a flow diagram that depicts a process for generating event data display code in accordance with one embodiment. At step 202, data is received that identifies the particular set of event data a user of Client 108 wishes to republish. The data identifying the particular set of event data is used to create a request command which, when submitted to the Events Repository 102, causes the Events Repository 102 to retrieve the particular set of event data. While Event Application 104 is generating the event data display code, the request command is embedded into the event data display code as described in further detail herein.

Referring now to FIG. 3A, a graphical user interface screen 302 for selecting a set of event data for republication is shown in accordance with one embodiment. Screen 302 includes an event selection area where a user of Client 108 can select a set of event data that the Client 108 wishes to republish. According to one embodiment, a set of event data is defined by one or more conditions which, when satisfied by an event record, cause the event record to become part of the set. For instance, one such condition may be that the event record must be an event that Client 108 has selected to be part of a watch list. According to one embodiment, a watch list includes events that the user of Client 108 has selected to "watch" or is otherwise interested in. Thus, event records which appear in the watch list of the user of Client 108 may be identified by information within the Events Repository 102. For instance, a particular field of an event record may indicate if the event record is part of the client's watch list. Thus, when selecting a set of event data for republication, the user of Client 108 may select all event records which are part of the user's watch list.

In another embodiment, a user may alternatively select all events that are included in a particular user-group. Event Application 104 may define groups of users or user-groups. User-groups define a set of users within the Event Application 104 with a common interest or attribute. For example, one user-group may be directed towards users in one geographic location while another user-group may be directed towards users with a particular taste in music. At screen 302, a user of Client 108 can select the particular group that Client 108 belongs to, causing all events within that user-group to be included in the set of event records for republication.

In other embodiments, a user of Client 108 may choose to republish all events that the user is authorized to republish. Republishing rights may be granted to a user for a particular event if one or more conditions are satisfied. For instance, republishing rights for an event record may be granted to a user if the user is the author of the event. Further, republishing rights may be granted to a user if the author of the event has designated that the user may view and/or republish the author's event. Whether a user has republishing rights to an event may be verified by examining the event record within the Events Repository 102. According to one embodiment, event records may contain a field indicating weather a particular user is allowed to view and/or republish the event record.

Once a user of Client 108 has selected a set of event records for republication, the user can additionally select display characteristics for presenting the selected event records at a graphical user interface. Still referring to FIG. 3A, graphical user interface screen 300 allows a user of Client 108 to select display characteristics for republishing event data. Display characteristics may include, but are not limited to, the style, color and size of a display area for displaying republished event data. As shown in FIG. 3A, a user of Client 108 may choose from a variety of display templates for displaying event data, or alternatively, may choose not to have any display style associated with the event data display code.

Referring now to FIG. 3B, a graphical user interface screen 302 for selecting additional display characteristics for republishing event data is shown in accordance with one embodiment. Other example display characteristics Client 108 may select include the number of events that the client would like to republish, the types of information the client would like to display when republishing the event data and any data formats for displaying the event data. In other embodiments, a user of Client 108 may select any number of display characteristics for customizing the display of the event data during republication. Once a user of Client 108 has selected the particular display characteristics for republishing event data, using the event application interface, the client requests that the event data display code be generated and provided back to Client 108.

Thus, referring back to FIG. 2, at step 204, Event Application 104 receives data identifying the display characteristics for republishing event data as selected by a user of Client 108. Next, at step 206, Event Application 104 receives the request from Client 108 to generate event data display code. In response, at step 208, Event Application 104 generates and provides the event data display code back to a user of Client 108 in an appropriate manner.

In one embodiment, the event data display code is provided back to a user of Client 108 on a graphical user interface screen of the Event Application Interface 106. Referring now to FIG. 3C, a graphical user interface screen 304 providing the event data display code is shown in accordance with one embodiment. FIG. 3C contains a dialogue box area which a user of Client 108 can interact with to perform a "copy and paste" operation to retrieve the code and insert the code into an application of the client's choice. For example, Client 108 may copy the code from the dialogue box, and then, using a web design application, insert the code into a desired location of a web page or client application.

In other embodiments, the event data display code may be provided back to a user of Client 108 in any appropriate manner, such as through an e-mail application or any other appropriate method of communicating the event data display code to the user.

Further, in another embodiment, the event data display code may be generated and provided to an entity other than a user of Client 108. For instance, the event data display code may be provided to a Web Server 110 for entry into one or more web page instructions. Web page instructions, referred to hereinafter as web page code, when processed, causes graphical user interface screens to be displayed to users utilizing web browser applications. Additionally, in another embodiment, the event data display code may be provided to a user of Client 108 through any other appropriate means.

Event Data Display Code

Referring to FIG. 3D, event data display code is shown in accordance with one embodiment. Event data display code may be represented by a set of instructions which, when processed by an application such as a web browser, creates a visual representation of the event data which the Client wishes to republish. According to an embodiment, the event data display code is in the Javascript language. Javascript is used to embed commands into the more common web language known as the Hypertext Transfer Markup Language (HTML). In other embodiments, the event data display code may be provided in any other language for executing instructions. Other languages that the event data display code may be in include, but are not limited to Flash and ActiveX.

Once a user of Client 108 has submitted a request for the event data display code, the Event Application 104 receives the request and generates the event data display code in accordance with the client's specifications. For instance, Event Application 104 generates event data display code which includes (a) a request for event records that satisfy the client's criteria, (b) display characteristics such as the color, size and of the display area, (c) the event record fields to include in the display. Note that the invention is not limited to the aforementioned characteristics, and clients may select any number of different characteristics to be used in generating the event data display code.

Thus, a user of Client 108 may request event data display code to be generated with certain characteristics from the Event Application 104, and in response, receive the event data display code as requested. In this manner, a user of Client 108 need not take the time and effort to develop the event data display code. When the event data display code is processed by applications, event records which satisfy the conditions specified by the user be displayed on a graphical user interface in the manner specified by the user. According to one embodiment, the event data display code is a set of one or more instructions, which, when executed, cause the selected event data to be displayed according to the display characteristics selected by the user of Client 108.

System for Republishing Event Data

Figure 4A:
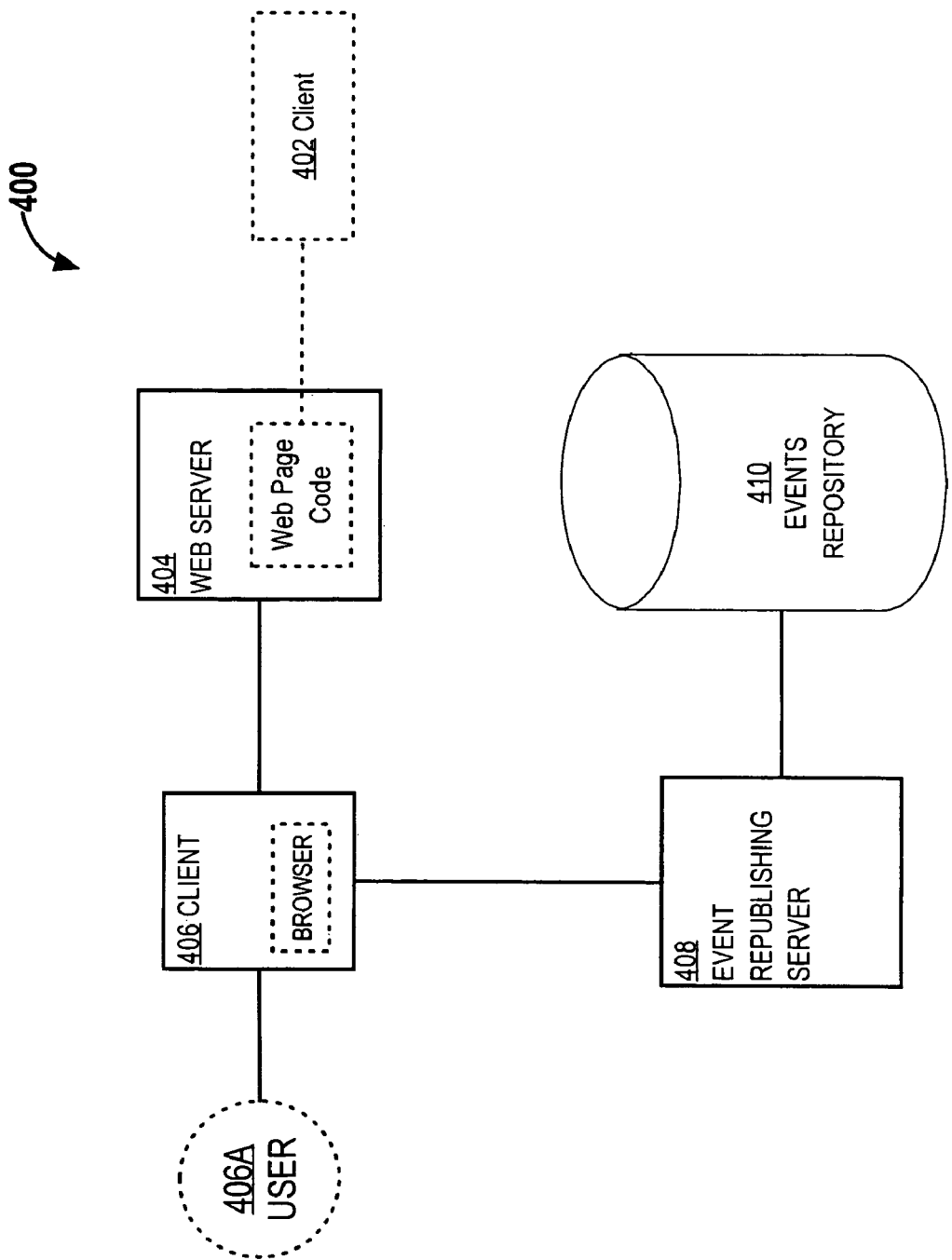
FIG. 4A is a diagram depicting a system for republishing event data according to one embodiment of the invention.

According to one embodiment, when a user of Client 108 has received the event data display code, the user may insert the event data display code into a web page or client application located away from the Event Application 104. Referring now to FIG. 4A, a system for republishing event data is shown in accordance with one embodiment. The system includes a Client 402, a Web Server 404, a Client 406, a User 406A, an Event Republishing Server 408 and an Events Repository 410. A user of Client 402A can insert event data display code into applications such as web page editors. A web page editor may be used to create web pages and other graphical user interface environments. According to one embodiment, a user of Client 402A inserts the event data display code into web page templates within the web page editor, causing the event data display code to become part of the web page code representing the entire web page. Accordingly, a user of Client 402A may send the web page code to Web Server 404 for publication. Web Server 404 hosts web pages and applications for publication to other users such as User 406A of Client 406. According to one embodiment, at least one web page hosted by Web Server 404 contains the event data display code generated by the Event Application 104.

According to one embodiment, User 406A, through Client 406, requests the particular web page containing the event data display code from Web Server 404. In response, Web Server 404 delivers the web page code, including the event data display code, to Client 406. The web page code is executed by a web browser application hosted on Client 406, which interprets and executes the web page code for display to User 406A. Web browser applications are used to parse and interpret web page code in order to create a graphical representation of web pages to end-users. For example, users browsing the Web may make a request for a web page to be displayed. Users request web pages by connecting to Web Server 404, which contains one or more web pages developed by Client 402. When the web page code is processed by the web browsers, the web page designed by Client 402 will display to User 406A.

During execution of the web page code, the event data display code is also executed by the browser application of Client 406. According to one embodiment, the event data display code is in the form of Javascript commands embedded within Hypertext Transfer Markup Language (HTML) instructions. Javascript commands may be interpreted and executed by any machine containing the appropriate application, such as a Javascript-capable web browser. Further, in other embodiments, the event data display code may be supplied as Flash actionscript code representing a Flash movie or dynamic image. Alternatively, the event data display code may be in any appropriate format. Note that in other embodiments, the code may be processed in many different manners.

When the event data display code is executed, a request for the particular set of event data is sent from Client 406 to Event Republishing Server 408. According to one embodiment, as described above, the request for the particular set of event data may be embedded within the event data display code. When the event data display code is executed, a request command is executed and sent to the Event Republishing Server 408. In response, Event Republishing Server 408 receives the request and performs one or more operations on Events Repository 410. Events Repository 410 responds to Event Republishing Server 408 with event data, and the event data is forwarded to Client 406 through Event Republishing Server 408. In response, to the request, Event Republishing Server 408 populates the event display area of the event data with the event records retrieved from the request.

Referring now to FIG. 4B, a diagram illustrating the communication flow for processing event data display code is shown in accordance with one embodiment. At step 412, User 406A of Client 406 requests content from Web Server 404. According to one embodiment, the content is a web page provided by Web Server 404, and User 406A requests the web page via the Internet. In response to the request, at step 414, Web Server 404 responds by providing Client 406 with the requested content or web page. In one embodiment, the web page requested by the user includes event data display code. On the user's device, an application such as a web browser processes the web page code, including the event data display code in order to display the web page to the user on a graphical user interface.

At step 416, when the event data display code is processed by the browser application, a request to retrieve event data is sent from the user's application to the Event Republishing Server 408. The Event Republishing Server 408 is responsible for authenticating the request and querying the Events Repository 410 for the appropriate event records. According to one embodiment, the request for event data embedded within the event data display code is in a format not native to the Events Repository 410. Thus, Event Republishing Server 408 receives the non-native request, interprets the request and generates a query that is in a format native to the Events Repository 410. At step 418, the Event Republishing Server 408 submits the query to the Events Repository 410, and at step 420, the Events Repository 410 responds with any event records that have satisfied the query.

The Event Republishing Server 408, at step 422, forwards the appropriate event records to the browser application on Client 406. According to one embodiment, the Event Republishing Server 408 is responsible for ensuring that the event records that satisfy conditions of the user's request are displayed with the correct characteristics. Thus, the Event Republishing Server 408 can interpret the event data display code and cause the event records to be displayed in the correct format. As such, the generation of event data display code and the republishing of event data away from an Event Application 104 is enabled.

Hardware Overview

Figure 5:
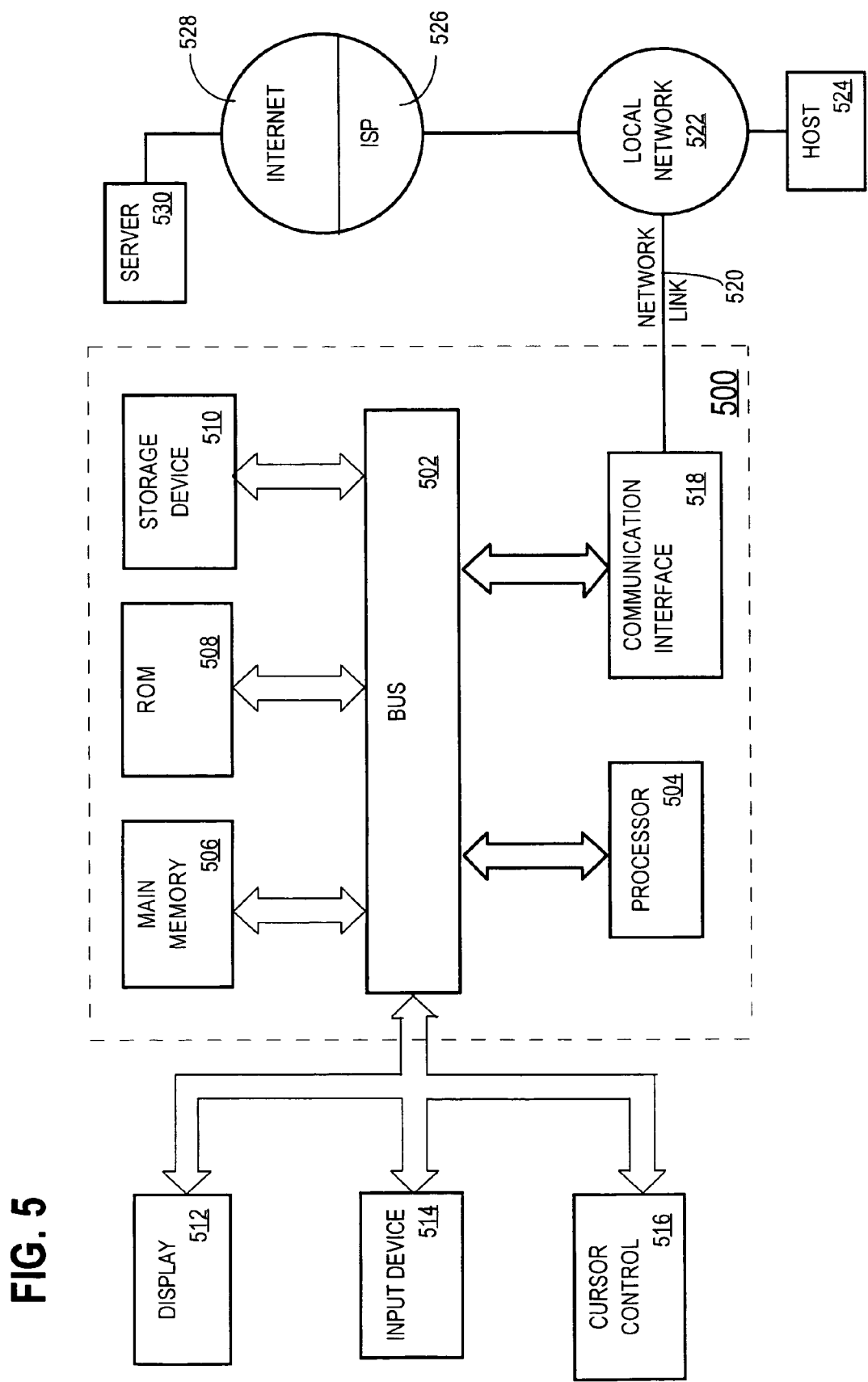
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer readable medium" as used herein refers to any medium that participates in providing data that causes a computer to operate in a specific fashion. In an embodiment implemented using computer system 500, various computer readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506.

Common forms of computer readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer readable media may be involved in carrying instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving, from a client over a network, first data that identifies event data stored in a repository, wherein the event data stored in the repository reflects one or more real world events;
receiving, from the client over the network, second data that identifies one or more display characteristics for the event data, wherein the one or more display characteristics indicate the manner in which the event data is to be displayed at the client;
receiving, from the client over the network, a request for event data display code for retrieving the event data from the repository and displaying the event data on a graphical user interface in the manner specified by the second data, wherein the event data display code includes a request to retrieve the event data from the repository; and
in response to the request for the event data display code, generating and providing to the client over the network, a first Web page that includes the event data display code, wherein a first Web browser rendering the first Web page does not cause the request to retrieve the event data from the repository to be issued and wherein when the event data display code is included in a second Web page and rendered by a second Web browser the request to retrieve the event data from the repository is issued.

2. The method of claim 1, wherein the event data stored in said repository indicates whether a particular event record has been marked of interest by the client.

3. The method of claim 2, wherein the event data identified by the first data includes any event record that has been marked of interest by the client.

4. The method of claim 1, wherein the event data stored in the repository indicates whether the client may republish a particular event record stored in said repository.

5. The method of claim 4, wherein the event data identified by the first data includes any event record that the client is allowed to republish.

6. The method of claim 1, wherein the one or more display characteristics further identify one or more data fields of the event data to display on a graphical user interface when the event data display code is processed.

7. The method of claim 1, wherein the one or more display characteristics further identify the amount of event data to display on a graphical user interface when the event data display code is processed.

8. The method of claim 1, wherein the one or more display characteristics further identify the color, size and style for displaying the event data on a graphical user interface when the event data display code is processed.

9. The method of claim 1, wherein the event data display code includes user-authentication information for accessing the repository.

10. The method of claim 1, wherein the event data display code is provided as Javascript commands embedded within Hypertext Transfer Markup Language (HTML) instructions.

11. The method of claim 1, wherein the event data display code is provided in any type of computer-readable instruction language.

12. The method of claim 1, wherein the second Web browser is different than the first Web browser.

13. The method of claim 1, wherein, in response to the request to retrieve the event data from the repository, the repository transmits the event data to the second Web browser.

14. A computer readable medium carrying instructions which, when processed by one or more processors, causes:
receiving, from a client over a network, first data that identifies event data stored in a repository, wherein the event data stored in the repository reflects one or more real world events;
receiving, from the client over the network, second data that identifies one or more display characteristics for the event data, wherein the one or more display characteristics indicate the manner in which the event data is to be displayed at the client;
receiving, from the client over the network, a request for event data display code for retrieving the event data from the repository and displaying the event data on a graphical user interface in the manner specified by the second data, wherein the event data display code includes a request to retrieve the event data from the repository; and
in response to the request for the event data display code, generating and providing to the client over the network, a first Web page that includes the event data display code, wherein a first Web browser rendering the first Web page does not cause the request to retrieve the event data from the repository to be issued and wherein when the event data display code is included in a second Web page and rendered by a second Web browser the request to retrieve the event data from the repository is issued.

15. The computer-readable medium of claim 14, wherein the event data stored in said repository indicates whether a particular event record has been marked of interest by the client.

16. The computer-readable medium of claim 15, wherein the event data identified by the first data includes any event record that has been marked of interest by the client.

17. The computer-readable medium of claim 14, wherein the event data stored in the repository indicates whether the client may republish a particular event record stored in said repository.

18. The computer-readable medium of claim 17, wherein the event data identified by the first data includes any event record that the client is allowed to republish.

19. The computer-readable medium of claim 14, wherein the one or more display characteristics further identify one or more data fields of the event data to display on a graphical user interface when the event data display code is processed.

20. The computer-readable medium of claim 14, wherein the one or more display characteristics further identify the amount of event data to display on a graphical user interface when the event data display code is processed.

21. The computer-readable medium of claim 14, wherein the one or more display characteristics further identify the color, size and style for displaying the event data on a graphical user interface when the event data display code is processed.

22. The computer-readable medium of claim 14, wherein the event data display code includes user-authentication information for accessing the repository.

23. The computer-readable medium of claim 14, wherein the event data display code is provided as Javascript commands embedded within Hypertext Transfer Markup Language (HTML) instructions.

24. The computer-readable medium of claim 14, wherein the event data display code is provided in any type of computer-readable instruction language.

25. The computer-readable medium of claim 14, wherein the second Web browser is different than the first Web browser.

26. The computer-readable medium of claim 14, wherein, in response to the request to retrieve the event data from the repository, the repository transmits the event data to the second Web browser.

27. An apparatus, comprising:
- a memory storing instructions which, when processed by one or more processors, causes:
  - receiving, from a client over a network, first data that identifies event data stored in a repository, wherein the event data stored in the repository reflects one or more real world events;
  - receiving, from the client over the network, second data that identifies one or more display characteristics for the event data, wherein the one or more display characteristics indicate the manner in which the event data is to be displayed at the client;
  - receiving, from the client over the network, a request for event data display code for retrieving the event data from the repository and displaying the event data on a graphical user interface in the manner specified by the second data, wherein the event data display code includes a request to retrieve the event data from the repository; and
  - in response to the request for the event data display code, generating and providing to the client over the network, a first Web page that includes the event data display code, wherein a first Web browser rendering the first Web page does not cause the request to retrieve the event data from the repository to be issued and wherein when the event data display code is included in a second Web page and rendered by a second Web browser the request to retrieve the event data from the repository is issued.

28. The apparatus of claim 27, wherein the event data stored in said repository indicates whether a particular event record has been marked of interest by the client.

29. The apparatus of claim 28, wherein the event data identified by the first data includes any event record that has been marked of interest by the client.

30. The apparatus of claim 27, wherein the event data stored in the repository indicates whether the client may republish a particular event record stored in said repository.

31. The apparatus of claim 30, wherein the event data identified by the first data includes any event record that the client is allowed to republish.

32. The apparatus of claim 27, wherein the one or more display characteristics further identify one or more data fields of the event data to display on a graphical user interface when the event data display code is processed.

33. The apparatus of claim 27, wherein the one or more display characteristics further identify the amount of event data to display on a graphical user interface when the event data display code is processed.

34. The apparatus of claim 27, wherein the one or more display characteristics further identify the color, size and style for displaying the event data on a graphical user interface when the event data display code is processed.

35. The apparatus of claim 27, wherein the event data display code includes user-authentication information for accessing the repository.

36. The apparatus of claim 27, wherein the event data display code is provided as Javascript commands embedded within Hypertext Transfer Markup Language (HTML) instructions.

37. The apparatus of claim 27, wherein the event data display code is provided in any type of computer-readable instruction language.

38. The apparatus of claim 27, wherein the second Web browser is different than the first Web browser.

39. The apparatus of claim 27, wherein, in response to the request to retrieve the event data from the repository, the repository transmits the event data to the second Web browser.

* * * * *